United States Patent
Kelly et al.

(10) Patent No.: US 10,062,042 B1
(45) Date of Patent: Aug. 28, 2018

(54) ELECTRONICALLY ASSIGNING TASKS TO WORKERS WHILE THE WORKERS ARE DISTRIBUTED AMONG DIFFERENT LOCATIONS WITHIN A WORK AREA

(71) Applicant: EMC Corporation, Hopkinton, MA (US)

(72) Inventors: Thomas J. Kelly, Bandon (IE); John R. Carmody, Cork (IE); Kevin P. Twomey, Cork (IE); Frank T. Smith, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 490 days.

(21) Appl. No.: 13/625,994

(22) Filed: Sep. 25, 2012

(51) Int. Cl.
*G06Q 10/00* (2012.01)
*G06Q 10/06* (2012.01)
*H04L 29/08* (2006.01)
*H04L 29/06* (2006.01)

(52) U.S. Cl.
CPC ........... *G06Q 10/063112* (2013.01); *G06Q 10/06313* (2013.01); *G06Q 10/063116* (2013.01); *H04L 65/403* (2013.01); *H04L 67/22* (2013.01)

(58) Field of Classification Search
CPC ..... G06Q 10/063112; G06Q 10/06313; G06Q 10/063116; H04L 67/22
See application file for complete search history.

(56) References Cited

U.S. PATENT DOCUMENTS

| | | | |
|---|---|---|---|
| 6,707,905 B2 * | 3/2004 | Lenard | 379/266.01 |
| 6,859,523 B1 * | 2/2005 | Jilk et al. | 379/32.01 |
| 7,233,159 B2 | 6/2007 | Allegeyer | |
| 7,617,248 B2 * | 11/2009 | Ditcharo et al. | |
| 8,478,303 B1 | 7/2013 | Joyce et al. | |
| 8,543,438 B1 * | 9/2013 | Fleiss | G06Q 10/0631 705/7.11 |
| 8,577,719 B2 * | 11/2013 | Bainbridge | G06Q 10/10 705/7.11 |
| 8,583,462 B2 * | 11/2013 | Podgurny et al. | 705/7.11 |
| 8,788,375 B2 * | 7/2014 | Podgurny et al. | 705/32 |
| 8,917,861 B2 * | 12/2014 | Clayton et al. | 379/265.12 |
| 8,971,916 B1 | 3/2015 | Joyce et al. | |
| 9,299,039 B1 * | 3/2016 | Wang | G06Q 10/063116 |
| 9,465,916 B2 * | 10/2016 | Girardeau | G08B 25/10 |

(Continued)

*Primary Examiner* — Matthew S Gart
*Assistant Examiner* — Stephen S Swartz
(74) *Attorney, Agent, or Firm* — BainwoodHuang

(57) ABSTRACT

A technique assigns tasks to workers within a work area. The technique utilizes electronic circuitry which can be disposed at a single location (e.g., a server), or distributed among multiple locations (e.g., in the cloud). The technique involves receiving task entries which (i) identify tasks in need of attention and (ii) define task requirements for performing the tasks. The technique further involves generating task assignments based on matching the task entries to worker profiles which (i) identify workers who are available for task assignment and (ii) define worker characteristics of the workers. The technique further involves providing the task assignments to the workers while the workers are distributed among different locations within the work area. The task assignments direct the workers to perform the tasks identified by the task entries in accordance with the task requirements defined by the task entries.

17 Claims, 6 Drawing Sheets

(56) References Cited

U.S. PATENT DOCUMENTS

| | | | |
|---|---|---|---|
| 2001/0049615 A1* | 12/2001 | Wong | G06Q 10/063112 705/7.14 |
| 2006/0026075 A1* | 2/2006 | Dickerson et al. | 705/26 |
| 2006/0053035 A1* | 3/2006 | Eisenberg | G16H 40/20 705/2 |
| 2006/0059490 A1* | 3/2006 | Knapp et al. | 718/100 |
| 2006/0100918 A1* | 5/2006 | Macy et al. | 705/10 |
| 2006/0235732 A1* | 10/2006 | Miller et al. | 705/7 |
| 2007/0174111 A1* | 7/2007 | Anderson et al. | 705/11 |
| 2007/0250370 A1* | 10/2007 | Partridge | G06Q 10/063112 705/7.14 |
| 2008/0147470 A1* | 6/2008 | Johri | G06Q 10/06 379/265.11 |
| 2008/0164998 A1* | 7/2008 | Scherpbier | G06Q 10/06 340/539.13 |
| 2008/0189162 A1* | 8/2008 | Ganong | G06F 17/3089 705/7.13 |
| 2009/0043634 A1* | 2/2009 | Tisdale | G06F 19/327 705/2 |
| 2009/0150479 A1* | 6/2009 | Eberlein | G06Q 10/06 709/203 |
| 2009/0204470 A1* | 8/2009 | Weyl et al. | 705/9 |
| 2010/0057510 A1* | 3/2010 | Stevens | G06Q 10/06393 705/7.42 |
| 2011/0078303 A1* | 3/2011 | Li et al. | 709/224 |
| 2011/0276396 A1* | 11/2011 | Rathod | 705/14.49 |
| 2011/0307902 A1* | 12/2011 | Nielsen et al. | 718/104 |
| 2011/0313803 A1* | 12/2011 | Friend | G06Q 10/06311 705/7.13 |
| 2012/0278388 A1* | 11/2012 | Kleinbart | G06Q 10/10 709/204 |
| 2013/0110567 A1* | 5/2013 | Omar | G06Q 10/06 705/7.14 |

* cited by examiner

| WORKER ID FIELD 100 | CURRENT LOCATION FIELD 102 | EXPERIENCE LEVEL FIELD 104 | EQUIPMENT AND TOOLS FIELD 106 | CERTIFICATION AND TRAINING FIELD 108 | ADDITIONAL FIELDS 110 |
|---|---|---|---|---|---|
| W. 40(3) | LOC. 26(7) | SENIOR TECH | FULL | OS+POWER | ... |
| W. 40(8) | UNAVAIL. | JUNIOR TECH | NONE | NONE | ... |
| W. 40(2) | LOC. 26(6) | TRAINEE | MINIMAL | OS | ... |
| W. 40(12) | UNAVAIL. | SENIOR TECH | NONE | NONE | ... |
| W. 40(1) | LOC. 26(2) | SENIOR TECH | FULL | POWER | ... |
| W. 40(4) | LOC. 26(9) | JUNIOR TECH | NONE | NETWORKS | ... |
| ... | ... | ... | ... | ... | ... |

FIG. 3

| TASK ID FIELD 120 | CURRENT LOCATION FIELD 122 | EXPERIENCE LEVEL FIELD 124 | EQUIPMENT AND TOOLS FIELD 126 | CERTIFICATION AND TRAINING FIELD 128 | ADDITIONAL FIELDS 130 |
|---|---|---|---|---|---|
| TASK 28(1) | LOC. 26(6) | JUNIOR TECH | NONE | NONE | ... |
| TASK 28(2) | LOC. 26(7) | JUNIOR TECH | MINIMAL | NONE | ... |
| TASK 28(3) | LOC. 26(2) | ANY | NONE | OS | ... |
| TASK 28(4) | LOC. 26(9) | ANY | NONE | OS | ... |
| TASK 28(5) | LOC. 26(11) | SENIOR TECH | FULL | NETWORKS | ... |
| TASK 28(6) | LOC. 26(5) | SENIOR TECH | FULL | POWER | ... |
| ... | ... | ... | ... | ... | ... |

FIG. 4

| TASK ID FIELD 140 | CURRENT LOCATION FIELD 142 | WORKER ID FIELD 144 | TIME ASSIGNED FIELD 146 | TIME COMPLETED FIELD 148 | ADDITIONAL FIELDS 150 |
|---|---|---|---|---|---|
| TASK 28(1) | LOC. 26(6) | W. 40(2) | 08:31:59 | IN PROGRESS | ... |
| TASK 28(2) | LOC. 26(7) | W. 40(3) | 08:33:09 | 08:44:05 | ... |
| TASK 28(3) | LOC. 26(2) | W. 40(1) | 08:33:12 | IN PROGRESS | ... |
| TASK 28(4) | LOC. 26(9) | W. 40(4) | 08:45:33 | IN PROGRESS | ... |
| ... | ... | ... | ... | ... | ... |

ELECTRONICALLY ASSIGNING TASKS TO WORKERS WHILE THE WORKERS ARE DISTRIBUTED AMONG DIFFERENT LOCATIONS WITHIN A WORK AREA

BACKGROUND

A conventional manufacturer may operate an assembly line to assemble and test products before shipping. In this situation, each point along the assembly line may include specialized manufacturing or test equipment that could require servicing from time to time (e.g., to replenish raw materials, to inspect equipment, to record operating status, to resolve manufacturing or testing problems, to provide routine maintenance, and so on).

To address such needs for service, some manufacturers may take a proactive approach by providing service people with lists of scheduled duties to carry out throughout the day or throughout a shift. For example, the first duty on the list for a particular service person may be to fix or replace a problematic component at a first point on the assembly line. The next duty on the list for that particular service person may be to inspect or calibrate another component at another point on the assembly line, and so on.

Other manufacturers may take a reactive approach to providing service by enlisting a team of service people who are available for dispatch as needs for service arise. Under this reactive approach, when a need for service at a particular point on the assembly line occurs, the next available service person on the team goes to that point on the assembly line to address that need.

SUMMARY

Unfortunately, there are deficiencies to the above-described conventional approaches to servicing points on an assembly line. For example, in the proactive approach which involves providing service people with lists of scheduled duties, the scheduled duties remain rigidly fixed once the service people are provided with the lists and begin their duties. Accordingly, at any particular moment in time, some areas of the assembly line may be occupied by many service people while others areas of the assembly line are not occupied by any service people at all due to variations in skill level, efficiency, etc. among the service people. As a result, after the manufacturer has provided the lists to the service people and the service people have begun their scheduled duties, a significant amount of time may be required for the manufacturer to locate and deploy a service person to address an unexpected issue on the assembly line (e.g., an unforeseen situation requiring immediate attention). Moreover, once a service person deviates from his or her list of scheduled duties to attend to the unexpected issue, it may no longer make sense for that service person to re-continue with the list of scheduled duties once the unexpected issue is resolved.

Additionally, in connection with the reactive approach which involves dispatching the next available service person to address each need as it arises, the possibility exists that the dispatched service person may have to travel a substantial distance across the assembly line to reach a problematic point on the assembly line even though another service person who is just as qualified is nearby that point. Moreover, once the dispatched service person reaches the problematic point, it is possible that the dispatched service person may not be qualified or not have the proper tools to address the service need. Accordingly, the reactive approach may suffer from relatively long response times, travel inefficiencies, and so on.

In contrast to the above-described conventional approaches to servicing an assembly line which may require significant amounts of time for service people to reach problematic points on the assembly line, improved techniques involve electronically assigning tasks to workers while the workers are distributed among different locations within a work area based on matching tasks to worker profiles. Such techniques are capable of taking into account proximity of the workers to task locations and worker skill level vis-à-vis the complexity of each task. Moreover, with such techniques, assignments can be prioritized and changed dynamically thus enabling the techniques to adapt to real time changes in the work area. Such techniques are suitable for a wide variety of applications such as an assembly line environment, a factory floor or staging environment (e.g., for computer equipment configuration and testing, etc.), a health facility (e.g., a hospital, a rehabilitation center, etc.), a field service territory, etc.

One embodiment is directed to a method of assigning tasks to workers within a work area. The method is performed by electronic circuitry which can be disposed at a single location (e.g., a server), or distributed among multiple locations (e.g., in the cloud). The method includes receiving, by the electronic circuitry, task entries which (i) identify tasks in need of attention and (ii) define task requirements for performing the tasks. The method further includes generating, by the electronic circuitry, task assignments based on matching the task entries to worker profiles which (i) identify workers who are available for task assignment and (ii) define worker characteristics of the workers. The method further includes providing, by the electronic circuitry, the task assignments to the workers while the workers are distributed among different locations within the work area. The task assignments direct the workers to perform the tasks identified by the task entries in accordance with the task requirements defined by the task entries.

Examples of task requirements include task locations, required tools, required worker certifications, required training within a recent time span, required levels of experience, combinations thereof, etc. Examples of worker characteristics include current worker locations, worker access to tools, worker certification, training within a recent time span, levels of experience, combinations thereof, etc.

It should be understood that, in the cloud context, the electronic circuitry is formed by remote computer resources distributed over a network. Such a computing environment is capable of providing certain advantages such as enhanced fault tolerance, load balancing, processing flexibility, etc.

In some arrangements, the workers have mobile devices (e.g., smart phones, tablets, wireless laptops, etc.). In these arrangements, providing the task assignments to the workers while the workers are distributed among different locations within the work area includes conveying, by the electronic circuitry, the task assignments to the mobile devices of the workers in a wireless manner while the workers are distributed among different locations within the work area. Accordingly, task assignment is capable of occurring in an ongoing manner rather than via lists at the start of the day or a shift. Moreover, modifications to tasks assignments can be easily coordinated remotely by the electronic circuitry.

In some arrangements, the method further includes receiving, by the electronic circuitry, location data from the mobile devices of the workers while the workers are distributed among different locations within the work area. In these arrangements, the method further includes updating, based on the location data from the mobile devices of the workers, the worker characteristics defined by the worker profiles to indicate current locations of the workers identified by the worker profiles. Accordingly, task assignments are easily based on current proximity of workers to task locations within the work area.

In some situations, when a task is about to be assigned, the electronic circuitry only evaluates workers who are within a predefined distance threshold, and weighs other factors such as current workload, efficiency, skill level, etc. before assigning that task to a particular worker. Such operation enables the electronic circuitry to make coordinated and optimized task assignments in real time. Moreover, while the workers remain at different locations within the work area, the electronic circuitry is capable of re-assigning tasks on the fly for further coordination and optimization.

In some arrangements, the method involves delivering tasks to workers within a work area in the form of electronically delivered customized real-time task lists that update depending on the worker's location, the priority of the tasks, and as new tasks are added. In these arrangements, workers are able to choose tasks, e.g., in response to contextual information the worker may be aware of that the electronic circuitry cannot account for. Along these lines, a worker is able to select a task from a task shortlist that the electronic circuitry has created specifically for that worker. From a higher perspective, the real time individual task lists that the electronic circuitry continually delivers and updates for each worker represents the electronic circuitry's ability to optimize the collective productivity of the workers. As each worker chooses a task from his respective list, that task would be automatically be removed from the lists of all other workers.

Other embodiments are directed to electronic systems and apparatus, processing circuits, computer program products, and so on. Some embodiments are directed to various processes, electronic components and circuitry which are involved in assigning tasks to workers while the workers are at different locations within a work area.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a block diagram of a database of worker profiles which is suitable for use by the electronic circuitry of FIG. 2.

FIG. 4 is a block diagram of task entries which are received and processed by the electronic circuitry of FIG. 2.

FIG. 5 is a block diagram of task assignments which are generated and maintained by the electronic circuitry of FIG. 2.

DETAILED DESCRIPTION

An improved technique involves electronically assigning tasks to workers while the workers are distributed among different locations within a work area based on matching tasks to worker profiles. Such a technique is capable of taking into account proximity of the workers to task locations, as well as worker skill level with respect to the complexity of each task. Moreover, with such a technique, assignments can be prioritized and changed dynamically thus enabling the technique to adapt to real time changes in the work area. Such a technique is suitable for a wide variety of applications such as an assembly line environment, a factory floor or staging area (e.g., for computer equipment configuration and testing, etc.), a health facility (e.g., a hospital, a rehabilitation center, etc.), a field service territory, etc.

Figure 1:
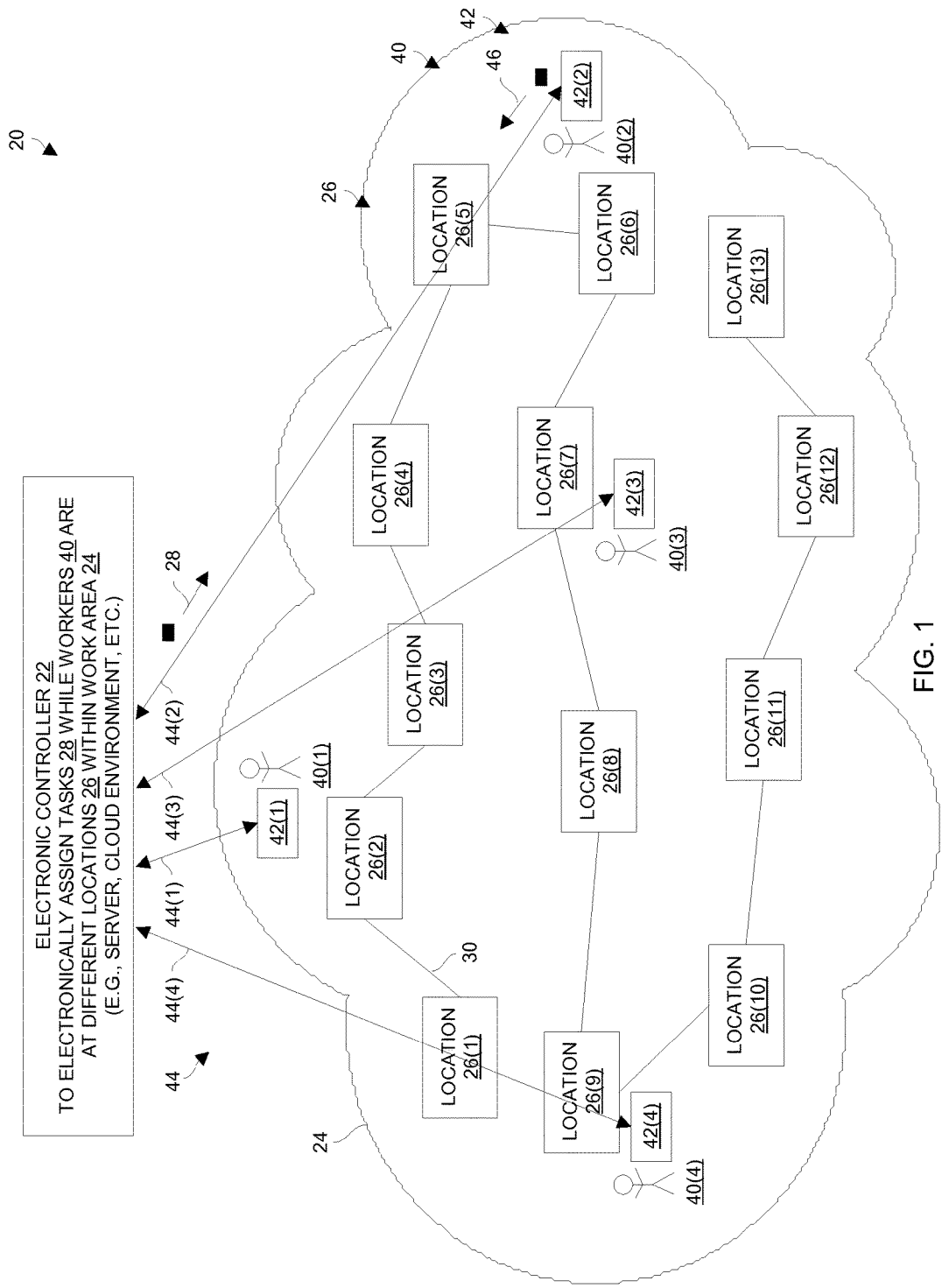
FIG. 1 is a general diagram illustrating an electronic environment which is suitable for assigning tasks to workers in real time while the workers are at different locations within a work area.

FIG. 1 shows an electronic environment 20 which is suitable for assigning tasks to workers while the workers are at different locations within a work area. The electronic environment 20 includes an electronic controller 22 (e.g., a server apparatus, a specialized device or assembly, a server farm, etc.) and a work area 24 (e.g., a manufacturing facility, a health facility, a geographical field service territory, etc.).

As shown in FIG. 1, the work area 24 includes multiple locations 26(1), 26(2), ... (collectively, locations 26) which may be connected together in some manner. Each location 26 may require one or more tasks 28 to be performed either routinely or due to unforeseen events. For example, a manufacturing facility may have, as the locations 26, production stages which require servicing and which connect in a particular manner to form a work flow or product pipeline (see connecting lines 30 in FIG. 1). Additionally, a health facility may have, as the locations 26, patient rooms, operating rooms, treatment areas, etc. holding patients in rooms which connect via hallways, elevators, etc. Furthermore, a field service territory may have, as the locations 26, field service sites, replacement component warehouses, etc. which connect via highways, access roads, etc., and so on.

As further shown in FIG. 1, workers (or users) 40(1), 40(2), ... (collectively, workers 40) have respective mobile devices 42(1), 42(2), ... (collectively, mobile devices 42), and are distributed among the locations 26 of the work area 24. The electronic controller 22 and the mobile devices 42 are constructed and arranged to establish respective wireless communication channels 44(1), 44(2), ... (collectively, communications channels 44) in order to communicate with each other in a wireless manner (e.g., via WiFi, via cellular signals, combinations thereof, etc.).

With such a wireless communications infrastructure in place, the workers 40 are able to move among the locations 26 of the work area 24 to perform tasks 28 at the locations 26 in response to task assignments provided by the electronic controller 22 to the mobile devices 42. During such activity, the mobile devices 42 provide task information 46 (e.g., location data, task status, etc.) back to the electronic controller 22 (see communications channel 44(2) in FIG. 1).

As will be explained in further detail shortly, the electronic controller 22 is equipped with a database of worker profiles which enables the electronic controller 22 to determine the most appropriate task assignment for any given worker 40 based on that worker's profile, task physical proximity, and so on.

In some arrangements, the electronic controller 22 simply assigns tasks 28 based on the worker profiles of the workers 40 and their proximity to the tasks 28. In other arrangements, the electronic controller 22 assigns tasks 28 taking additional criteria into account such as priorities of the tasks 28 (e.g., low, medium, high, etc.), the workload of other workers 40 in the vicinity, and so on. In contrast to conventional systems which do not deliver automated real-time task assignment and re-assignment to service people as they move through the work area 24, the improved techniques permit assignment of the most appropriate task 28 to each worker 40 at any point in time, and at any physical location 26 within the work area 24.

In some arrangements, tasks assignments are provided in two stages. First, the workers 40 are provided with task lists to make the workers 40 aware of what the electronic controller 22 considers to be the most appropriate tasks 28 for the workers 40 to complete at any moment in ranked order. Next, each worker 40 reviews his task list (e.g., perhaps accessing other contextual information) and chooses the task 28 that the worker will actually complete. Once a worker 40 selects a task 28 from that worker's task list, the electronic controller 22 removes that task 28 from the task lists of other workers 40 if that task 28 was listed (i.e., the same task 28 may have been listed on the task lists of multiple workers 40 if the electronic controller 22 decided that the multiple workers 40 were qualified based on profile and location. Such operation provides additional flexibility and customization in real time since some workers 40 may be in the work area 24 but not on shift (e.g., in training), some workers 40 may be in need of a lunch break, and so on. Accordingly, such an arrangement further optimizes the collective productivity of the workers 40. Further details will now be provided with reference to FIG. 2.

Figure 2:
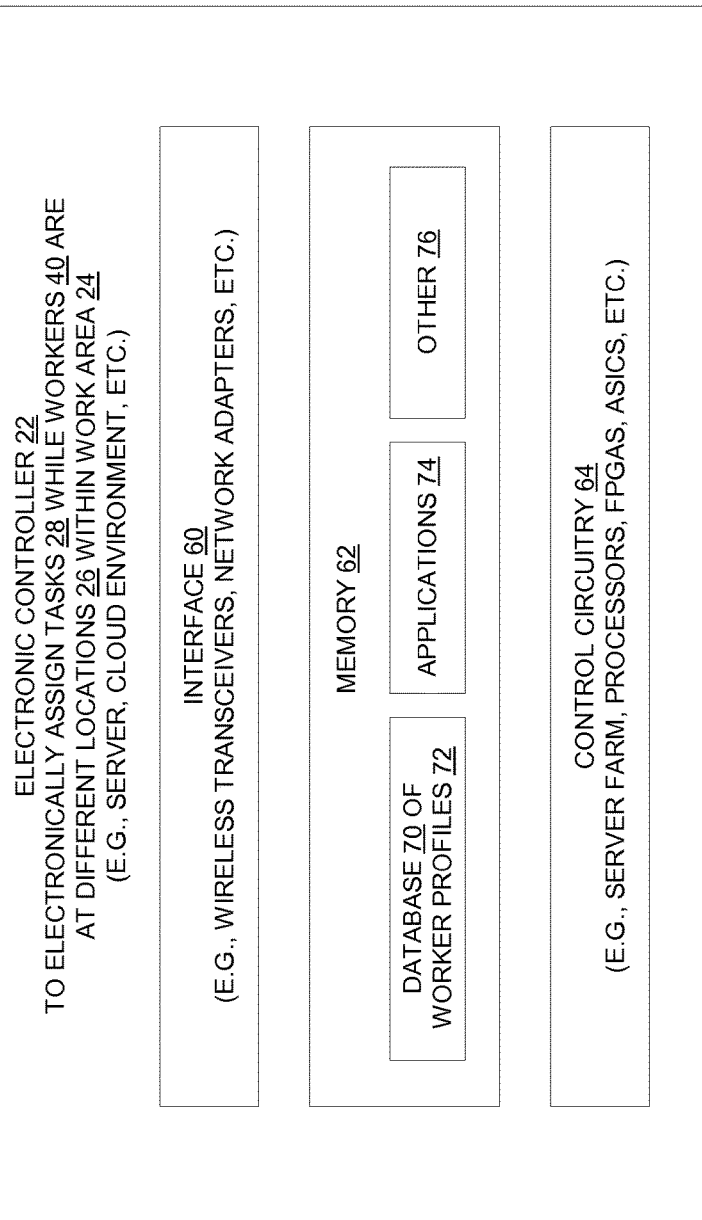
FIG. 2 is a block diagram of electronic circuitry of the electronic environment of FIG. 1.

FIG. 2 shows particular details of the electronic controller 22 which assigns tasks 28 to workers 40 within the work area 24 (also see FIG. 1). The electronic controller 22 includes an interface 60, memory 62, and control circuitry 64.

The interface 60 is constructed and arranged to connect the electronic controller 22 to external devices. Along these lines, the interface 60 enables the electronic controller 22 to communicate with the mobile devices 42 in a wireless manner (e.g., via WiFi, via cellular signals, etc.). In some arrangements, the interface 60 further includes a set of network adapters to connect to various networks (e.g., LAN(s)/WAN(s)/SAN(s), the Internet, the telephone land line system, and so on).

The memory 62 is intended to represent both volatile memory (e.g., semiconductor-based memory) and non-volatile memory (e.g., disk memory) of the electronic controller 22. As shown in FIG. 2, the memory 62 stores a database 70 of worker profiles 72 which (i) identify workers 40 who are available for task assignment and (ii) define worker characteristics of the workers 40, as well as a set of applications 74 which direct the operation of the control circuitry 64. The memory 62 may include additional software constructs 76 such as an operating system, administrative tools, and so on.

The control circuitry 64 is constructed and arranged to assign tasks 28 to the workers 40 while the workers 40 are distributed among the locations 26 within the work area 24. The control circuitry 64 capable of being implemented in a variety of ways including via one or more processors running specialized software (e.g., see the applications 74 in FIG. 2), application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering all or portions of the software to the electronic apparatus 40. The computer program product 80 has a non-transitory (or non-volatile) computer readable medium which stores a set of instructions which controls one or more operations of the control circuitry 64. Examples of suitable computer readable storage media include tangible articles of manufacture and apparatus which store instructions in a non-volatile manner such as CD-ROM, flash memory, disk memory, tape memory, and the like.

In some arrangements, the electronic controller 24 is implemented via remote computer resources distributed over a computerized network. For example, the electronic controller 24 can be formed by a server farm which is tightly located in a computerized facility, or alternatively distributed over a wide geographic area for disaster tolerance.

During operation, the control circuitry 64 receives task requests 90 through the interface 60. The task requests 90 may be provided by electronic equipment within the work area 24, by the workers 40 within the work area 24, by an automated scheduler, by communication lines running to sensors and/or equipment at the locations 26, and so on. Each task request 90 includes a task entry 92 which (i) identifies a task 28 in need of attention and (ii) defines task requirements 94 for performing that task 28. Some task requests 90 may include multiple task entries 92.

In response to the task requests 90, the control circuitry 64 generates task assignments 96 based on matching the task entries 92 to the worker profiles 70 of the database 70. Accordingly, the control circuitry 64 is able to take into account, among other things, the experience of the workers 40 and how far away they are from the particular location 26 for the requested task 28.

The control circuitry 64 then provides, through the interface 60, the task assignments 96 to the workers 40 while the workers 40 are distributed among the various locations 26 within the work area 24. Upon receipt of the task assignments 96, the task assignments 96 direct the workers 40 to perform the tasks 28 identified by the task entries 92 in accordance with the task requirements 94 defined by the task entries 92. Further details of some of the above-mentioned data constructs will now be provided with reference to FIGS. 3 through 5.

FIGS. 3 through 5 show particular details of the above-mentioned data constructs utilized by the electronic environment 20 (also see FIGS. 1 and 2 above). FIG. 3 shows an example set of worker profiles 72 for the database 70. FIG. 4 shows an example set of task entries 92 which the control circuitry 64 (FIG. 2) matches with worker profiles 72. FIG. 5 shows an example set of task assignments 96 which are conveyed from the electronic controller 22 to the mobile devices 42 of the workers 40 in real time.

These example details are presented in the context of a manufacturing test environment of an IT hardware products manufacturer. Other applications of the improved techniques and other implementations are suitable as well.

As shown in FIG. 3, the example worker profiles 72 have a multi-field format. In particular, each worker profile 72 includes a worker identifier field 100, as well as worker characteristic fields including a current location field 102, an experience level field 104, an equipment and tools field 106, a certification and training field 108. The worker profiles 72 have other fields 110 as well.

Each worker profile 72 uniquely identifies a particular worker 40 and defines respective characteristics for that worker 40. For instance, in connection with the worker profile 72(1), the worker identifier field 100 stores a unique worker identifier identifying worker 40(3) (also see FIG. 1), the current location field 102 stores a location identifier indicating that worker 40(3) is currently at location 26(7), the experience level field 104 stores data indicating that worker 40(3) is a senior technician, the equipment and tools field 106 stores data indicating that worker 40(3) is fully provisioned with tools, and the certification and training field 108 stores data indicating that worker 40(3) possesses recent training in operating systems and power, and so on. The other fields 110 for the worker profile 72(1) includes additional information, e.g., whether worker 40(3) is currently assigned any tasks 28 and, if so, how many tasks 28, to which shift the worker 40(3) is assigned, etc.

It should be understood that at least some of the information within the worker profiles 72 can be gathered prior to the workers 40 entering the work area 24. In particular, information such as experience level, certification and training, etc. can be gathered in response to the workers 40 over time (e.g., months/years of employment, after the workers 40 have completed certain technical courses, etc.).

Additionally, at least some of the worker profile information can be gathered in real time while the workers 40 are distributed among the locations 26 within the work area 24. In particular, information can be gathered dynamically from the mobile devices 42 (e.g., location via GPS circuitry within the mobile devices 42, equipment status via Bluetooth between the mobile devices 42 and the equipment at the locations 26, etc.). Also, some worker profile information can be collected, maintained and monitored by the electronic controller 22 independently (e.g., time left of the workers' shift, required or scheduled appointments/tasks, etc.).

As shown in FIG. 4, the example task entries 92 have a multi-field format as well. In particular, each task entry 92 includes a task identifier field 120, as well as task requirement fields including a current location field 122, an experience level field 124, an equipment and tools field 126, a certification and training field 128. The task entries 72 have other fields 130 as well.

Each task entry 92 uniquely identifies a particular task 28 and defines respective requirements for that task 28. For instance, in connection with the task entry 92(1), the task identifier field 120 stores a unique task identifier identifying a task 28(1), the current location field 122 stores a location identifier indicating the location 26 for that task 28(1), the experience level field 124 stores data indicating a required level of experience (e.g., minimum experience, preferred experience, etc.) required to perform that task 28, the equipment and tools field 106 stores data indicating what equipment and tools are required for a worker to perform that task 28, and the certification and training field 108 stores data indicating what certification and training are required for a worker 40 to perform that task 28. The other fields 130 for the task entry 92(1) include additional information, e.g., a standard amount of time required for a worker 40 to complete the task 28, a text description, diagnostic information, a priority of the task 28, etc.

As mentioned earlier, the task entries 92 are received from the locations 26 within the work area 40 (e.g., via task requests 70 for service). Other task entries 92 may be received from other sources such as the workers 40 (e.g., manually provided observations and identified needs for service as the workers 40 move within the work area 24, from a scheduler for routine tasks 28, etc.). The control circuitry 64 queues these task entries 92 (e.g., see the memory 62 in FIG. 2) until the control circuitry 64 generates respective task assignments 96 for the task entries 92.

As shown in FIG. 5, the example task assignments 96 have a multi-field format and are distributed to the mobile devices 40 as well maintained by the electronic controller 24. Each task assignment 96 includes a task identifier field 140, a current location field 142, a worker identifier field 144, a time assigned field 146, and a time completed field 148. The task assignment 96 have other fields 150 as well.

Each task assignment 96 is generated and maintained by the electronic controller 22, and pairs a task 28 with a worker 40. For instance, in connection with the task assignment 96(1), the task identifier field 140 stores a unique task identifier identifying a task 28(1), the current location field 142 stores a location identifier indicating the location 26(7) for that task 28(1), the worker identifier field 144 stores a unique worker identifier identifying a worker 40(3) assigned to the task 28(1), a time assigned field 146 which stores a timestamp indicating when the task 28(1) was assigned to the worker 40(3), and a time completed field 148 which stores a timestamp indicating when the task 28(1) was completed. The other fields 150 for the task assignment 96(1) include additional information, e.g., the time that the initial task request 90 was received by the electronic controller 22, the priority of the task 28(1), etc.

It should be understood that the control circuitry 64 is capable of making the task assignments 96 by smartly pairing the tasks 28 identified by the task entries 92 with the workers 40 identified by the worker entries 70. A variety of mechanisms are suitable for performing these pairing operations.

For example, in some arrangements, the control circuitry 64 is policy based. Here, the control circuitry 64 applies a set of policies (or rules) to the task entries 92 as they are received in order to choose the most appropriate worker 40 to attend to the tasks 28 identified by these task entries 92. For instance, the control circuitry 64 may initially apply a policy of selecting the closest worker 40 to the location 26 of the task 28. Distance can be measured a variety of ways, e.g., number of hops along an assembly line, linear feet, number of rooms along a hallway, etc. Additionally, the control circuitry 64 can be configured to not select certain workers 40, e.g., workers 40 who are further than a predetermined distance from the location 26, workers 40 who have started another task 28 within the last five minutes, etc. If there is a tie in candidate workers 40 (i.e., multiple workers 40 who are the same distance away), the control circuitry 64 may apply second level policy or rule such as a policy which selects the worker 40 with the closest matching qualifications to the task requirements, or the worker 40 who started the shift most recently, and so on.

In other arrangements, the control circuitry 64 uses mechanisms other than policies. Such mechanisms may include analytics, fuzzy logic, neural networks, and so on. Other configurations are suitable as well. Further details will now be provided with reference to FIG. 6.

Figure 6:
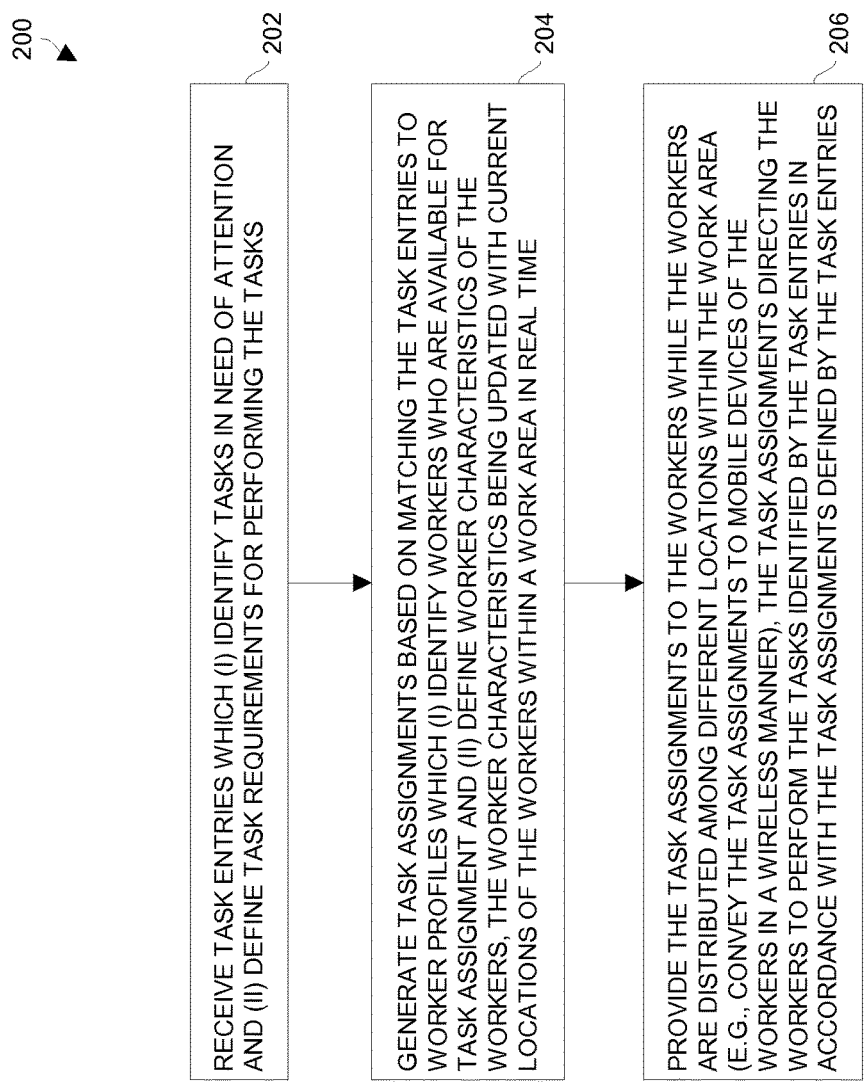
FIG. 6 is a flowchart of a procedure which is performed by the electronic circuitry of FIG. 2.

FIG. 6 is a flowchart of a procedure 200 which is performed by electronic circuitry of the electronic controller 22 of FIG. 2 to assign tasks 28 to workers 40 within the work area 24. In step 202, the electronic controller 22 receives task entries 94 which (i) identify tasks 28 in need of attention and (ii) define task requirements 94 for performing the tasks 28.

In step 204, the electronic controller 22 generates task assignments 96 based on matching the task entries 92 (FIG. 4) to worker profiles 72 (FIG. 3) which (i) identify workers 40 who are available for task assignment and (ii) define worker characteristics of the workers 40. It should be understood that the worker characteristics are routinely updated with the current locations of the workers 40 within the work area 24. Along these lines, the mobile devices 42 that the workers carry (e.g., see the wireless communication channels 44 in FIG. 1), door sensors, etc. are able to report the current locations to the electronic controller 22 in real time.

In step 206, the electronic controller 22 provides the task assignments 96 (FIG. 5) to the workers 40 while the workers 40 are distributed among different locations 26 within the work area 24 (e.g., via the wireless communication channels 44 to the mobile devices 42, see FIG. 1). The task assignments 96 direct the workers 40 to perform the tasks 28 identified by the task entries in accordance with the task requirements 96 defined by the task entries 92. Such operation enables the electronic controller 22 to base each task assignment 96 on how far away the workers 40 are from the particular location 26 for the particular task 28 as well as the experience of the workers 40.

As described above, improved techniques involve electronically assigning tasks 28 to workers 40 while the workers 40 are distributed among different locations 26 within a work area 24 based on matching tasks 28 to worker profiles 72. Such techniques are capable of taking into account proximity of the workers 40 to task locations 26 and worker skill level vis-à-vis the complexity of each task 28. Moreover, with such techniques, task assignments can be prioritized and changed dynamically thus enabling the techniques to adapt to real time changes in the work area 24. Such techniques are suitable for a wide variety of applications such as an assembly line environment, a factory floor or staging environment (e.g., for computer equipment configuration and testing, etc.), a health facility (e.g., a hospital, a rehabilitation center, etc.), a field service territory, etc.

One should appreciate that the electronic controller 22 is capable of assigning tasks 28 to improve productivity in any endeavor that involves a number of groups of users with different skill sets, who are collectively responsible for delivering a service, operating a process, and/or manufacturing a product. Unfortunately, in a traditional approach of allocating a task to an employee (e.g., a technician, engineer or other type of service provider) in a simple list-based manner, where the employee checks the list and takes ownership of a task simply because it is at the top of the list, the conventional system doesn't take into account the experience of the employee or how far away from the system the employee is currently located. This leads to uneven distribution of activity, as well as inefficient movement of employees between task locations.

However, the improved techniques are able to take the current location 26 of all workers 40 so that customized task assignments 96 are presented to the mobile device 42 of each worker 40. These customized task assignments 96, which are generated in real-time while the workers 40 are out in the worker area 24, can be based on worker experience, current location, and so on. These customized real-time task assignments 96 constantly update to account for changes in worker location, the priority of the tasks, and as new tasks are added.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the electronic controller 22 of FIG. 2 is capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the electronic environment 20 and the associated data constructs shown in FIGS. 3 through 5 were described as being for a manufacturing test environment for an IT hardware products manufacturer by way of example only. In other arrangements, the electronic environment 20 and the associated data constructs apply to a different context. Furthermore, for particular implementations and applications, various modifications and enhancements can be made to the various data constructs of FIG. 3 through 5 to accommodate these implementations, e.g., adding special data fields, augmenting certain fields to contain enhanced data, etc.

For example, the electronic environment 20 is suitable for use by a health facility such as a hospital, health clinic, or rehabilitation center. Here, the electronic controller 22 assigns tasks to health care professionals as they roam different areas of the health facility. Along these lines, nurses and doctors carry respective mobile devices 42 which receive task assignments 96 directing them attend to clusters of patients within wings or floors based on worker characteristics such as their current locations 26 as reported back to the electronic controller 22 via the mobile devices 42 and their respective skills, and so on. The task assignments 96 result from matching of particular workers to patient requests (e.g., calls for a nurse), needs for a doctor due to a call from a nurse or an electronic monitor, triggers from regular scheduling, and so on. In these situations, distance between a worker 40 and a particular location 26 requiring service is capable of being measured in linear feet, number of floors away, number of rooms away, etc.

As another example, the electronic environment 20 is suitable for use by a field service department of an organization such as a utility company, a computer company, a transportation company, etc. Here, the electronic controller 22 assigns tasks to field service specialists as they travel across different areas of a geographical territory. In particular, field service specialists carry respective mobile devices 42 which receive task assignments 96 from the electronic controller 22 directing them attend to visit and service particular locations 26 in the field (i.e., the work area 24) based on worker characteristics such as their current locations 26 as reported back to the electronic controller 22 via the mobile devices 42 and their respective skills, etc. The task assignments 96 result from matching of particular workers to customer requests (e.g., customer service requests), calls due to equipment faults or outages, triggers from regular scheduling, and so on. In these situations, distance between a worker 40 and a particular location 26 requiring service is capable of being measured in miles, estimated travel time, driving distance to a highway, etc.

Furthermore, it should be understood that in the earlier-provided assembly line example, it may be relatively easy to visually identify points along the assembly line that require attention. However, in other situations, the need for attention may not be readily apparent from a simple visual view of the work area. For example, in a production testing environment where it may not be absolutely clear which systems arrived before or after others, there may be less of an assembly line environment and more chaos (potentially). In such a situation, the workers could easily rely on the electronic controller 22 to track the progress of the individual systems and identify events/alerts/etc. to the workers 40 to impose organized and efficient allocation of tasks 28 even though which systems are "almost done" and which systems are "new to the testing environment" may not be visually evident.

Additionally, as mentioned earlier, the system is able to continuously deliver the most appropriate subset of the entire list of tasks to each worker 40, based on the available criteria (role, location, experience, certification etc.). For example, in some arrangements, all workers 40 aware of what the system believes are the most appropriate tasks 28 for them to complete at any given moment in ranked order. The workers 40 are then allowed to bring other contextual information to bear and choose tasks 28 they will actually complete. Once a particular worker 40 selects a task 28 from his list, that task 28 is removed from other workers lists (whose profiles and location meant that they also had this task 28 in their list somewhere, but maybe lower in their lists). Such operation enables the workers 40 to factor in additional information, e.g., they might be in the work area 24 but on internal training, they might be just heading for their lunch break and the task could be easily picked up by another worker 40, etc.

In some arrangements, the system color codes the list to give the worker 40 other information, such as the fact that a particular task 28 has been added to his list only—as no-one else is currently available, with the right skills and certifications to complete the task 28. That is, in these arrangements, the number of other workers 40 whose list contains a particular task 28 is shown against each task 28 in a particular workers list to allow workers 40 to make informed choices of what to do next. Such modifications, enhancements, and implementations are intended to belong to various embodiments of this disclosure.

What is claimed is:

1. In electronic circuitry, a method of electronically communicating task information in real time to mobile devices of workers within a work area, the method comprising:
   receiving, by the electronic circuitry, task entries which (i) identify tasks in need of attention and (ii) define task requirements for performing the tasks, the electronic circuitry electronically storing the task entries in a multi-field format;
   generating, by the electronic circuitry, task assignments based on electronically matching the task entries to worker profiles which (i) identify workers who are available for task assignment and (ii) define worker characteristics of the workers, the electronic circuitry electronically storing the worker profiles in a multi-field format; and
   providing, by the electronic circuitry, the task assignments to the workers in real time while the workers are distributed among different locations within the work area, the task assignments directing the workers to perform the tasks identified by the task entries in accordance with the task requirements defined by the task entries;
   wherein each of the workers has a respective mobile device constructed and arranged to communicate with the electronic circuitry in a wireless manner,
   wherein providing the task assignments to the workers includes (i) wirelessly transmitting, by the electronic circuitry, a respective list of multiple task assignments to the mobile device at least some of the workers, the list of one worker differing from the list of another worker, and (ii) providing a particular task assignment in the lists transmitted to the mobile devices of a subset of the workers, such that the lists provided to the mobile devices of the subset of workers include the same particular task assignment, and
   wherein the method further comprises, in response to a first worker of the subset of workers selecting the particular task assignment:
      wirelessly receiving, by the electronic circuitry and in real time, an indication from the mobile device of the first worker that the first worker has selected the particular task assignment; and
      wirelessly transmitting, to the mobile devices of each of the other workers in the subset of workers in real time, a task removal message, the task removal message directing each mobile device receiving the task removal message to remove the particular task assignment from the list of task assignments on the respective mobile device,
      the method thereby transmitting and updating work lists in real time to workers dispersed across the work area,
   wherein the workers have mobile devices, and wherein providing the task assignments to the workers while the workers are distributed among different locations within the work area includes conveying, by the electronic circuitry, the task assignments to the mobile devices of the first subset of the employees in a wireless manner while the workers are distributed among different locations within the work area,
   wherein the method further comprises:
      receiving, by the electronic circuitry, GPS data from the mobile devices of the workers while the workers are distributed among different locations within the work area, and
      based on the GPS data from the mobile devices of the workers, updating the worker characteristics defined by the worker profiles in real time to indicate current locations of the workers identified by the worker profiles,
   wherein each worker profile defines, as a worker characteristic, a current worker location of a respective worker identified by that worker profile;
   wherein each task entry defines, as a task requirement, a task location for a respective task identified by that task entry; and
   wherein generating the task assignments based on matching the task entries to worker profiles includes creating a particular task assignment which assigns a particular task to a particular worker only when a distance between a current worker location of the particular worker, as indicated by the GPS data received from the mobile device of the current worker, and a task location for the particular task is less than a predetermined distance threshold.

2. A method as in claim 1 wherein each worker profile defines (i) a current worker location of a respective worker identified by that worker profile as a first worker characteristic and (ii) a current worker capacity of the respective worker identified by that worker profile as a second worker characteristic;

wherein each task entry defines, as a task requirement, a task location for a respective task identified by that task entry; and wherein generating the task assignments based on matching the task entries to worker profiles includes allocating task assignments among the workers based on both current worker location and current worker capacity to efficiently load balance the task assignments among the workers.

3. A method as in claim 1 wherein each worker profile defines, as a worker characteristic, a current skill of a respective worker identified by that worker profile;

wherein each task entry defines, as a task requirement, a task qualification for a respective task identified by that task entry; and wherein generating the task assignments based on matching the task entries to worker profiles includes creating a particular task assignment which assigns a particular task to a particular worker only when the current skill of the particular worker, as indicated by the work profile identifying that particular worker, satisfies the task qualification for the particular task.

4. A method as in claim 3 wherein the current skill of the particular worker satisfies the task qualification for the particular task only when the worker profile identifying the particular worker indicates that the particular worker has a level of work experience which is greater than a required level of work experience, as indicated by the task qualification for the particular task.

5. A method as in claim 3 wherein the current skill of the particular worker satisfies the task qualification for the particular task only when the worker profile identifying the particular worker indicates that the particular worker has completed a particular training course, as indicated by the task qualification for the particular task, within a recent predefined period of time.

6. A method as in claim 1 wherein each task entry defines, as a task requirement, a task priority to indicate a level of importance for a respective task identified by that task entry; and wherein generating the task assignments based on matching the task entries to worker profiles includes creating the task assignments for more important tasks ahead of task assignments for less important tasks based on the task priority of each task entry.

7. A method as in claim 1, further comprising:

after providing the task assignments to the workers, receiving new task entries identifying new tasks;

generating new task assignments based on matching the new task entries to the worker profiles; and providing the new task assignments to the workers while the workers remain distributed among different locations within the work area.

8. A method as in claim 1 wherein the work area includes a factory floor;

wherein the worker profiles identify, as the workers who are available for task assignment, skilled technicians who are deployed among different equipment stations on the factory floor, the different equipment stations being constructed and arranged to assemble and test products prior to shipping; and wherein receiving the task entries includes acquiring requests, from the different equipment stations, for attention by the skilled technicians.

9. A method as in claim 1 wherein the work area includes a health facility;

wherein the worker profiles identify, as the workers who are available for task assignment, skilled specialists who are visiting different patient rooms of the health facility, the different patient rooms supporting patients having different care needs; and wherein receiving the task entries includes acquiring requests, from the different patient rooms, for attention by the skilled specialists.

10. Electronic apparatus to assign tasks to electronically communicate task information to mobile devices of workers within a work area, the electronic apparatus comprising:

an interface;

a database to store worker profiles which (i) identify workers who are available for task assignment and (ii) define worker characteristics of the workers; and control circuitry coupled to the interface and the database, the control circuitry being constructed and arranged to:

receive, through the interface, task entries which (i) identify tasks in need of attention and (ii) define task requirements for performing the tasks, the electronic circuitry electronically storing the task entries in a multi-field format, generate task assignments based on electronically matching the task entries to the worker profiles, the electronic circuitry electronically storing the worker profiles in a multi-field format, and provide, through the interface, the task assignments to the workers in real time while the workers are distributed among different locations within the work area, the task assignments directing the workers to perform the tasks identified by the task entries in accordance with the task requirements defined by the task entries;

wherein each of the workers has a respective mobile device constructed and arranged to communicate with the electronic circuitry in a wireless manner, wherein the control circuitry, when providing the task assignments to the workers, is constructed and arranged to (i) wirelessly transmit, by the electronic circuitry, a respective list of multiple task assignments to the mobile device at least some of the workers, the list of one worker differing from the list of another worker, and (ii) providing a particular task assignment in the lists transmitted to the mobile devices of a subset of the workers, such that the lists provided to the mobile devices of the subset of workers include the same particular task assignment, and wherein, in response to a first worker of the subset of workers selecting the particular task assignment, the control circuitry is further constructed and arranged to:

wirelessly receive, by the electronic circuitry and in real time, an indication from the mobile device of the first worker that the first worker has selected the particular task assignment; and wirelessly transmit, to the mobile devices of each of the other workers in the subset of workers in real time, a task removal message, the task removal message directing each mobile device receiving the task removal message to remove the particular task assignment from the list of task assignments on the respective mobile device, the electronic apparatus thereby transmitting and updating work lists in real time to workers dispersed across the work area, wherein the control circuitry is further constructed and arranged to:
    receive, via the wireless transceiver, GPS data from the mobile devices of the workers while the workers are distributed among different locations within the work area,
    based on the GPS data from the mobile devices of the workers, update the worker characteristics defined by the worker profiles stored in the database in real time to indicate current locations of the workers identified by the worker profiles;
    after providing the task assignments to the workers, receive new task entries identifying new tasks;
    generate new task assignments based on matching the new task entries to the worker profiles including the GPS data received from the mobile devices while the workers are distributed among different locations within the work area; and
    provide the new task assignments to the workers while the workers remain distributed among different locations within the work area.

11. Electronic apparatus as in claim 10 wherein the interface includes a wireless transceiver; wherein the workers have mobile devices; and wherein the control circuitry, when providing the task assignments to the workers while the workers are distributed among different locations within the work area, is constructed and arranged to:
    convey, via the wireless transceiver, the task assignments to the mobile devices of the first subset of the employees while the workers are distributed among different locations within the work area.

12. A computer program product having a non-transitory computer readable medium which stores a set of instructions to electronically communicate task information in real time to mobile devices of workers within a work area, the set of instructions, when carried out by computerized circuitry, causing the computerized circuitry to perform a method of:
    receiving task entries which (i) identify tasks in need of attention and (ii) define task requirements for performing the tasks, the electronic circuitry electronically storing the task entries in a multi-field format;
    generating task assignments based on electronically matching the task entries to worker profiles which (i) identify workers who are available for task assignment and (ii) define worker characteristics of the workers, the electronic circuitry electronically storing the worker profiles in a multi-field format; and
    providing the task assignments to the workers in real time while the workers are distributed among different locations within the work area, the task assignments directing the workers to perform the tasks identified by the task entries in accordance with the task requirements defined by the task entries;
    wherein each of the workers has a respective mobile device constructed and arranged to communicate with the electronic circuitry in a wireless manner,
    wherein providing the task assignments to the workers includes (i) wirelessly transmitting, by the electronic circuitry, a respective list of multiple task assignments to the mobile device at least some of the workers, the list of one worker differing from the list of another worker, and (ii) providing a particular task assignment in the lists transmitted to the mobile devices of a subset of the workers, such that the lists provided to the mobile devices of the subset of workers include the same particular task assignment, and
    wherein the method further comprises, in response to a first worker of the subset of workers selecting the particular task assignment:
        wirelessly receiving, by the electronic circuitry and in real time, an indication from the mobile device of the first worker that the first worker has selected the particular task assignment; and
        wirelessly transmitting, to the mobile devices of each of the other workers in the subset of workers in real time, a task removal message, the task removal message directing each mobile device receiving the task removal message to remove the particular task assignment from the list of task assignments on the respective mobile device,
        the method thereby transmitting and updating work lists in real time to workers dispersed across the work area,
    wherein the method performed by the computerized circuitry further includes:
        receiving, by the electronic circuitry, GPS data from the mobile devices of the workers while the workers are distributed among different locations within the work area;
        based on the GPS data from the mobile devices of the workers, updating the worker characteristics defined by the worker profiles to indicate current locations of the workers identified by the worker profiles;
        after providing the task assignments to the workers, receiving new task entries identifying new tasks;
        generating new task assignments based on matching the new task entries to the worker profiles including the GPS data received from the mobile devices while the workers are distributed among different locations within the work area; and
        providing the new task assignments to the workers while the workers remain distributed among different locations within the work area.

13. A computer program product as in claim 12 wherein the workers have mobile devices; and wherein providing the task assignments to the workers while the workers are distributed among different locations within the work area includes:
    conveying the task assignments to the mobile devices of the first subset of the employees in a wireless manner while the workers are distributed among different locations within the work area.

14. A method as in claim 1 wherein providing the task assignments to the workers while the workers are distributed among different locations within the work area includes providing the workers with mobile devices, and transmitting the task assignment to a plurality of the workers with worker characteristics matching the task requirements of the task entries using the mobile devices;
    wherein matching the task entries to worker profiles includes obtaining current worker location data based upon location data from the mobile devices and assessing a distance between the current worker location and a location of the task entry to be assigned as a portion of the worker characteristics used for matching the task entries;
    wherein generating the task assignments based on matching the task entries to worker profiles includes creating the task assignments for more important tasks ahead of task assignments for less important tasks based on the task priority of each task entry; and
    wherein the method further comprises, in response to a particular worker of the plurality of workers receiving the task assignment selecting the task assignment, providing an electronic update message to the mobile devices to remove that task assignment from the mobile devices.

15. A method as in claim 1 wherein the work area resides within a production facility of the employer; and wherein electronically gathering performance characteristics includes:
- accumulating, as at least some of the performance characteristics, data from respective mobile devices of the employees while the employees perform previously-assigned tasks within the production facility.

16. A method as in claim 1, wherein wirelessly transmitting, by the electronic circuitry, the respective list of multiple task assignments to the mobile device of each of the workers includes providing each list in ranked order, wherein a rank of the particular task assignment on the list of the first worker differs from the rank of the particular task assignment on the list of at least one of the other workers in the subset of workers.

17. A method as in claim 16, wherein, when wirelessly transmitting the respective list of multiple task assignments to the mobile device of each of the workers, the method further includes specifying, in the list transmitted to the first worker, a number of other workers whose list contains the particular task assignment.

* * * * *